United States Patent [19]
Klatt et al.

[11] Patent Number: 4,755,359
[45] Date of Patent: Jul. 5, 1988

[54] ARRANGEMENT FOR THE REMOVAL OF HYDROGEN

[75] Inventors: Karl-Heinz Klatt; Helmut Wenzl, both of Julich; Amiya K. Chakrakorty, Erftstadt, all of Fed. Rep. of Germany

[73] Assignee: Kernforschungsanlage Jülich Gesellschaft mit Beschränkter Haftung, Julich, Fed. Rep. of Germany

[21] Appl. No.: 13,347

[22] Filed: Feb. 11, 1987

[30] Foreign Application Priority Data

Feb. 12, 1986 [DE] Fed. Rep. of Germany ....... 3604416

[51] Int. Cl.⁴ ............... G05D 16/06; B01D 50/00; B01D 53/36
[52] U.S. Cl. ................... 422/113; 422/168; 55/520; 55/310; 502/527
[58] Field of Search ............ 422/49, 113, 117, 118, 422/168, 240, 242; 55/16, 158, 520, 310; 220/371-373; 502/527

[56] References Cited

U.S. PATENT DOCUMENTS

| 1,115 | 4/1839 | Button et al. | 422/171 X |
| 2,038,071 | 4/1936 | Wilhelm | 55/520 X |
| 2,552,615 | 5/1951 | Baltzer | 55/520 X |
| 3,521,429 | 7/1970 | Leffler | 55/520 X |
| 3,733,792 | 5/1973 | Taylor | 55/520 X |
| 4,468,235 | 8/1984 | Hill | 55/16 |

Primary Examiner—David L. Lacey
Assistant Examiner—Timothy M. McMahon
Attorney, Agent, or Firm—Scully, Scott, Murphy & Presser

[57] ABSTRACT

An arrangement for the elimination or removal of hydrogen from a hydrogen-containing gas mixture through the intermediary of foils which are fastened within a closable container, wherein the material of the foils produces an elimination of hydrogen, whereby the foils are so arranged at such spacings with respect to each other as to form interspaces between the foils which can be streamed through by the gas mixture. At least one supporting member having the foils adhering thereto is arranged within the container in such a manner that the foils will extend into the surroundings upon opening of the container. Especially suitable for this purpose are spirally-wound supporting members which will extend out of the container under the effect of gravity or under the action of a mechanical spring force, and in this manner provide a direct contact between the effective foil material and the explosively dangerous gas mixture.

7 Claims, 3 Drawing Sheets

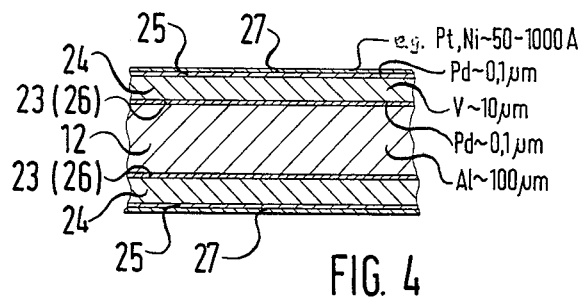
FIG. 4
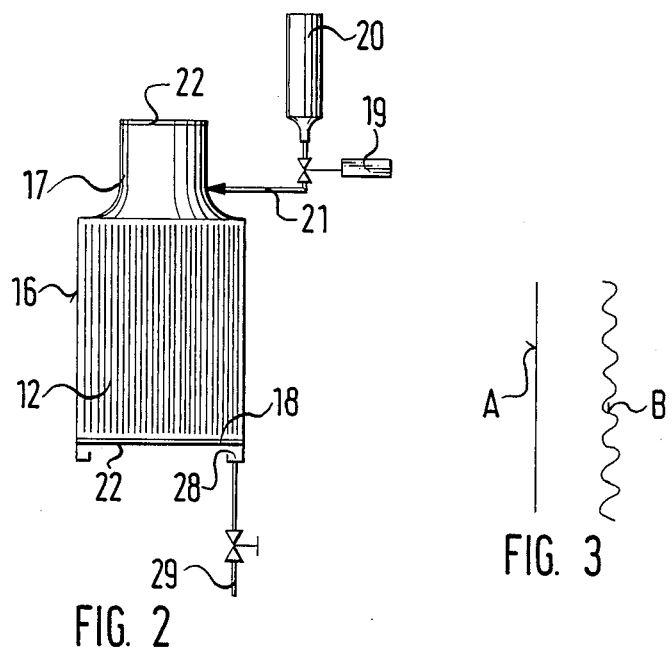
FIG. 2
FIG. 3

ARRANGEMENT FOR THE REMOVAL OF HYDROGEN

BACKGROUND OF THE INVENTION

1. Field of the Invention

The present invention relates to an arrangement for the elimination or removal of hydrogen from a hydrogen-containing gas mixture through the intermediary of foils which are fastened within a closable container, wherein the material of the foils produces an elimination of hydrogen, whereby the foils are so arranged at such spacings with respect to each other as to form interspaces between the foils which can be streamed through by the gas mixture.

The problem of removing hydrogen from a gas mixture is of extraordinary significance, especially with regard to nuclear reactor accidents, in which hydrogen escapes into the oxygen-containing atmosphere of the safety tank or into a pressure reduction or let down system of the nuclear reactor, and as a consequence of which there is encountered the danger of an explosion. Difficulties of this kind can occur especially during nuclear melt-down accidents of light-water reactors.

2. Discussion of the Prior Art

In order to eliminate or remove hydrogen which is contained in the atmosphere of the safety tank, it is known to aspirate the gas mixture and to react it outside of the safety tank with copper oxide $Cu_2O$ at a temperature of 200° C., referring to W. Baukal, et al. "MÖglichkeiten zur Wasserstoffbeseitigung", BMI-1984-033, 1984. This procedure is designated as a "non-reversible method", inasmuch as the copper which is formed during the reaction must be replaced. Additionally, it is also considered a prerequisite that, for the aspiration of the hydrogen, energy must be available for the operation of pumps.

It is also known from the article by L. Thompson "Program Plan for ERRI Hydrogen Combustion and Control Studies", ERRI, Palo Alto Nov. 81 and M. Berman, et al., "Hydrogen Behavior and Light-Water-Reactors", Nuclear Safety, Vol. 25, No. 1, 1984, to initiate a controlled ignition of the gas mixture within the safety tank. However, the secondary reactions which result from such a measure and the encountered stresses on the safety tank are not clearly elucidated. In particular, the encountered speed of propagation of the flame front which is, upon occasion, higher than expected because of turbulences within the gas mixture, and the resultant danger of a detonation, is viewed as being critical.

For implementing the removal of hydrogen contained in gas mixtures, from the disclosure of U.S. Pat. No. 4,468,235, it is known to employ gettering materials which are contacted with the gas mixture. Hereby, the gas mixture flows through a laminate such as a sheet-metal packet, containing foils constituted of gettering material, which are arranged at spacings with respect to each other and form interspaces which are penetrated through by the gas mixture. However, in the utilization of such an arrangement in the case of disturbances, in which there is encountered the danger of an explosion as a consequence of hydrogen penetrating into an atmosphere containing oxygen, the necessary contact between the gettering material and the gas mixture cannot be provided sufficiently rapidly, and not without additional auxiliary aggregates, such as pumps or condensers.

SUMMARY OF THE INVENTION

Accordingly, it is an object of the present invention to provide an arrangement through which the hydrogen is passively removed from gas mixtures; in effect, without any active intervention, especially by aggregates requiring power supply energy, for instance, such as pumps. The arrangement should be able to be arranged with only a relatively small spatial requirement within a safety tank of nuclear reactor installations; most possibly at locations wherein hydrogen tends to collect in the case of a disturbance or accident and wherein there are produced sources for a detonation. The arrangement should be employable as a safety element and remain in functional preparedness over a number of years without requiring any servicing.

The foregoing object of the invention is achieved through the intermediary of an arrangement of the type under consideration herein, wherein at least one carrier or supporting member having the foils adhering thereto is arranged within a container in such a manner that the foils will extend into the surroundings upon opening of the container. Especially suitable for this purpose are spirally-wound supporting members which will extend out of the container under the effect of gravity or under the action of a mechanical spring force, and in this manner provide a direct contact between the effective foil material and the explosively dangerous gas mixture.

The container is opened, in the case of an accident, either in dependence upon the hydrogen concentration in the gas mixture which is to be purified upon the exceeding of a predetermined hydrogen concentration, or upon the exceeding of a predetermined super-atmospheric pressure. For implementing the opening of the container under super-atmospheric pressure, there are provided rupture discs on the container. The supporting members are so inserted into the container that, after the opening of the container, through the heating of the gas mixture there is generated a convective gas flow as a consequence of its reaction with the foil material, which will conduct the gas mixture along the surfaces of the foils. Taking place is a heating of the gas mixture during a gettering of hydrogen in the foil, as well as during a catalytic oxidation of the hydrogen with the formation of water; thus, for example, through the utilization of a palladium-coated foil.

Expediently, the supporting member is constituted of a metal, especially a shot-blasted metal. Appliable onto metals such as copper, silver, gold and aluminum, are the foils which are required for the hydrogen reaction, which are similarly constituted of metal or metal alloys, and which are most expediently applied as layers or coatings. The foils are either vapor-deposited or electro-deposited onto the supporting members in the form of metal layers or coatings. In addition to this advantage for the formation of the reaction coatings on the supporting member, the mechanical properties thereof are also of significance due to their high degree of heat conductivity. The heat which is developed during the hydrogen reaction can be conducted off through the metallic supporting members in the container and to the surroundings. Suitable as a material for the supporting members as a good heat conductor possessing a low specific weight and a high ductility, which is required for the extension of the supporting members into the surroundings, is preferably a material such as aluminum.

An operational state of readiness for the container, which does not necessitate any servicing over lengthy periods of time, is attained through the presence of an inert gas atmosphere in the interior of the container. The inert gas is present under a slight super-atmospheric pressure within the container, and prevents the ingress of impurities, especially of sulfur and chlorine. Suitable as inert gases are especially argon and other noble gases.

BRIEF DESCRIPTION OF THE DRAWINGS

Reference may now be had to the following detailed description of exemplary embodiments of the invention, taken in conjunction with the accompanying drawings; in which:

FIG. 2 illustrates an injector-like container with rupture discs;

FIG. 3 illustrates individual supporting member configurations; and

FIG. 4 illustrates a sectional view of foils arranged on a supporting member.

DETAILED DESCRIPTION

Figure 1:
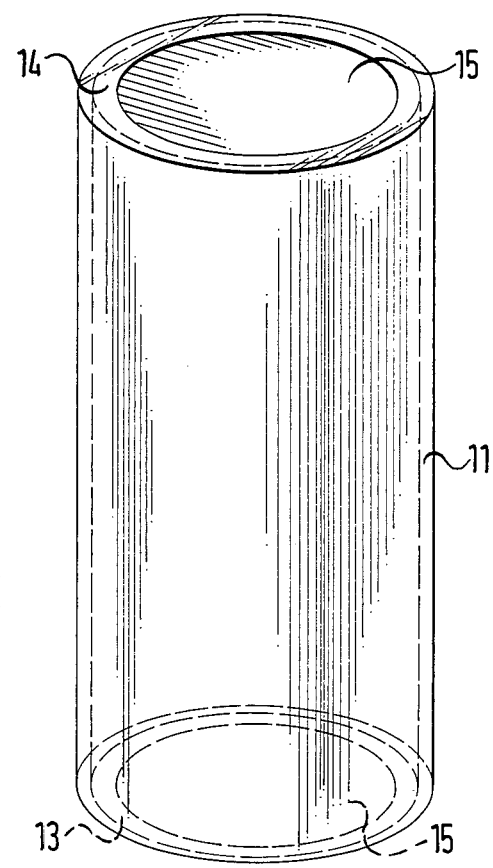
FIG. 1 illustrates a drum-shaped container with rupture discs and spiral supporting members.
Figure 1A:
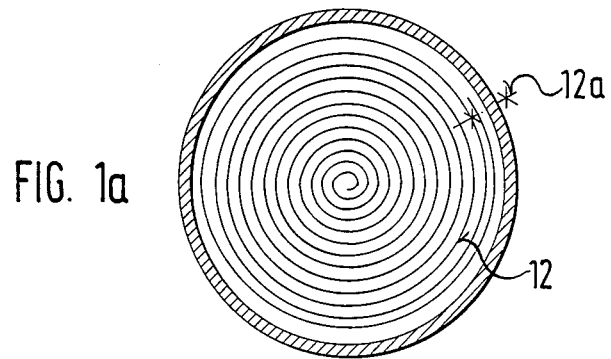
FIG. 1a illustrates a transverse cross-sectional view through FIG. 1.
Figure 1B:
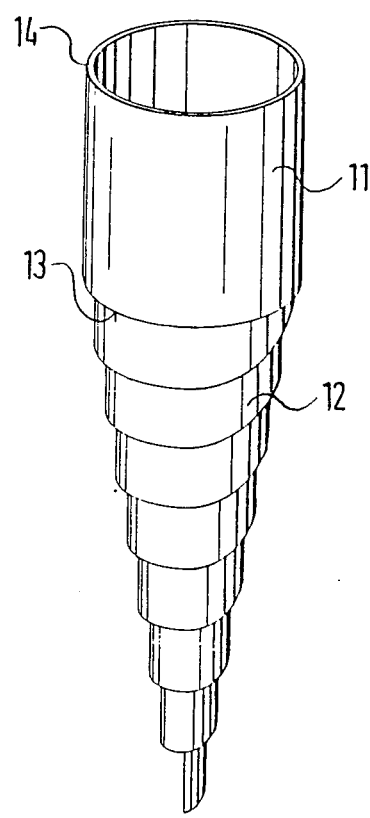
FIG. 1b illustrates the container showing the foil carrier extended out into the surroundings.

FIG. 1 illustrates a drum-shaped container 11 which is constituted of thin sheet metal, for example, of aluminum. Inserted in a spiral configuration into the container is a carrier substrate or supporting member 12 with a foil adhering thereto. The supporting member 12 is fastened within the container in a manner such that the supporting member will extend into the surroundings upon the opening of the container 11. In the illustrative embodiment, the container 11 is shown positioned vertically, for instance, suspended from a ceiling. The supporting member 12 is internally fastened within the container; as the fasting means 12a there serve either screws or rivets, which are only schematically shown in the drawing. Instead of such fastening means, the supporting member can also be welded to the container.

Up to the location of the above-mentioned fastening of the supporting member to the inside of the container 11, the supporting member 12 rests freely on the container bottom 13 when the container is closed. The container bottom 13 and the cover 14 of the container are closed with rupture discs 15, which will rupture in the presence of super-atmospheric pressure in the environment or surroundings. In the illustrated embodiment, the rupture discs 15 are designed so that they will rupture at a pressure of 1.5 bar. When the container opens, in this embodiment the inner spiral portion of the supporting member will directly extend under the action of gravity into the surroundings below the container, so that the foil surface which reacts with the gas mixture will immediately come into contact with the gas mixture. For the implementation of a rapid expansion of the supporting member into the surroundings, it is also possible to elastically pretension the spirally wound supporting member 12, or depending upon conditions, to also employ additional mechanical elastic biasing devices which extend the supporting member.

The gas mixture surrounding the container 11 warms up during its reaction along the foil surface, and hereby streams into the container 11. Produced is a convective gas flow which also encompasses the surroundings about the container, so as to prevent any undesirable formations of coatings in the space which is streamed through by the gas mixture. In order to intensify this flow of gas, in FIG. 2 there is illustrated a container 16 whose exposed flow cross-section narrows towards its head end portion 17 in contrast with the cross-section at the bottom end 18. In this manner, an injection flow for the gas mixture is produced in the container 16.

Instead of a vertical positioning of the containers 11 and 16, it is also possible to contemplate a horizontal position; in effect, an orientation of the containers such that the axis of the spirally-wound supporting member is horizontally arranged. Containers which are located in this position are suitably not opened at their end surfaces but along their casing, and in such a particular manner, that the supporting member for the foils will roll out similar to a Venetian blind or louver and extend from the container into the surroundings. This rolling out sequence can be supported with the aid of mechanical springs and be effected as a result of the action of gravity. Instead of spirally-wound members it is also possible to employ adjacently arranged supportive plate members in containers which are constructed in conformance with the plate configuration. The containers are to be opened in a manner such that, after opening, the plates will extend into the surroundings about the container and can then be streamed about by gas. When the supporting member is extended, the catalytic action will initially commence locally at such surface regions of the supporting member at which a hydrogen concentration is present which is sufficient for the initial reaction. Hereby, the supporting members will heat up. This not only propagates the convective flow of the gas, but also the catalytic reaction in such surface regions in which there are evident lower hydrogen reactions.

The container 16 is filled with an inert gas, and stands in communication with a warning devie 19 which opens the container 16 upon the exceeding of a predetermined hydrogen concentration in the surroundings about the container. For this purpose, an inert gas supply container 20 serves for the filling of the container, from which supply container there can be introduced additional inert gas through a gas conduit 21 into the interior of the container 16 in the case of an accident, and such a super-atmospheric pressure is generated as to destroy the rupture discs 22 in the cover 13 and bottom 18 and the container will open.

The provision of a supporting member with a foil which, in addition to a catalytic action during the oxidation of the hydrogen, will also evidence gettering properties for the hydrogen, is illustrated in FIG. 4. In FIG. 4 there is schematically illustrated a cross-section of the supporting member. Provided initially on the supporting member 12 are a protective layer 23 and a gettering area 24, which are covered by an outer layer 25. The gettering area is covered by the protective layer 23 and the layer 25 in order to prevent any oxidation of the gettering area. The protective layer and the outer layer are applied in an oxide-free manner onto the gettering area, the layers are vapor-deposited or electro-deposited onto the surface of the gettering area under a vacuum. In the illustrated embodiment, the gettering area 24 is constituted of vanadium, the outer layer 25 and the protective layer 23 are constituted of palladium. The supporting member 12 is constituted of aluminum.

The layers which are formed on the supporting member 12 are, in general, extremely thin and form a foil of not more than about 30 μm in thickness. Prior to the application of the foil layer, the supporting member can be initially additionally also covered with an intermediate layer or coating 26, preceding the application of the remaining layers. It is not necessary to provide an oxide-free surface for the supporting member during the application of the foil layer. In the illustrated embodiment, for the intermediate layer 26, in the same manner as for the protective layer 23, there is employed palladium. Consequently, the intermediate layer is thereby no longer distinguishable from the protective layer 23 subsequent to the application of the latter. In the illustrated embodiment, the outer layer 25 is also provided with a further covering coating or layer 27 which is constituted of platinum or nickel, so that the foil will also sufficiently effectively react with hydrogen even in the presence of aggressive or corrosive gas constituents; for example, in the presence of chlorine in the gas mixture. The thickness of the supporting member in the illustrated embodiment is about 20 μm, the intermediate layer and protective layer of palladium are 1,000 Å, the gettering area of vanadium is 10 μm thick. The thickness of the covering layer 27 of platinum is about 50 to 1,000 Å, in the illustrated embodiment about 200 Å.

Through the formation of the foil layers by means of vapor deposition or electro-deposition, there is created an extremely intimate bond between the material layers. The application in a vacuum leads to mutually good adherent layers; in particular, there can be completely avoided any oxidations on the surfaces of the layers.

The foils on the supporting member illustrated in FIG. 4 are produced under an ultra-high vacuum; in essence, at pressures of $10^{-7}$ bar and below. The ultra-high vacuum is necessary so that prior to the application of the layers, there cannot form any oxide layer on the presently underlying metallic material.

When the foil layers possess an outer layer which is constituted of palladium, then water will form on the outer layer due to the catalytic oxidation of the hydrogen. During the cooling of the container, the formed water will condense on the wall of the container. At the container 16, the water collects in a condensate trough 28 which is provided for this purpose. From there, the water can be conducted away through a discharge 29.

In order to determine the catalytic effectiveness of the foil in the presence of oxygen and hydrogen in the gas mixture, there was set in a closed volume of 3 liters an air to hydrogen ratio of 9:1 at a pressure of 1 bar, and reacted under contact with a foil quantity of about 1 gram. Water was formed within ½ hour from about 70% of the hydrogen, whereby the starting pressure within this period of time was reduced by about 7% relative to the total pressure. It could be determined that water vapor, carbon monoxide or carbon dioxide contained in the gas mixture exerted only a slight influence over the reaction sequences.

Possible shapes for the supporting member sheets are illustrated in FIG. 3. There can be employed flat sheets A, but also corrugated sheets B. The surface of the sheets is roughened, for example, through shot-blasting or the stamping in of a fine surface structure, such that the sheets possess the greatest possible catalytically effective surface.

What is claimed is:

1. An apparatus for the removal of hydrogen from a hydrogen-containing gas mixture comprising foil material defining foils fastened within a closable container, said foils having a material causing a removal of hydrogen, and said foils being arranged at a spacing relative to each other so as to provide interspaces between the foils which are traversable by a gas mixture; the improvement comprising: at least one supporting member for said foils being located n said container and with the foils being adherent thereto, such that the foils will extend into the surroundings about the container upon opening of the container.

2. An apparatus as claimed in claim 1, wherein said supporting member is spirally-wound within the container and extends into the surrounds upon opening of the container under the action of gravity of an elastic spring action.

3. An apparatus as claimed in claim 1, wherein said container is constructed so that it opens responsive to the exceeding of a predetermined hydrogen concentration in a gas mixture.

4. An apparatus as claimed in claim 1, wherein said container comprises rupture discs for opening the container upon the exceeding of a predetermined super-atmospheric pressure in the surroundings about the container.

5. An apparatus as claimed in claim 1, wherein said supporting member is arranged in said container such that the inner spiral portion of the supporting member extends into the surround below the container to produce a convective gas flow upon opening of the container through a heating of a gas mixture, which conducts a gas mixture along the surfaces of the foils.

6. An apparatus as claimed in claim 1, wherein the supporting member with the foils adherent thereto is constructed of aluminum or an aluminum alloy.

7. An apparatus as claimed in claim 1, further comprising a source of inert gas and means for connecting said source of inert gas to said container for providing an inert gas at a pressure above atmospheric pressure.

* * * * *